United States Patent
Fan et al.

(10) Patent No.: US 9,990,555 B2
(45) Date of Patent: Jun. 5, 2018

(54) VIDEO DETECTION METHOD, VIDEO DETECTION SYSTEM AND COMPUTER PROGRAM PRODUCT

(71) Applicants: BEIJING KUANGSHI TECHNOLOGY CO., LTD., Beijing (CN); PINHOLE (BEIJING) TECHNOLOGY CO., LTD., Beijing (CN)

(72) Inventors: Haoqiang Fan, Beijing (CN); Zhimin Cao, Beijing (CN)

(73) Assignees: BEIJING KUANGSHI TECHNOLOGY CO., LTD., Beijing (CN); PINHOLE (BEIJING) TECHNOLOGY CO., LTD., Beijing (CN)

( * ) Notice: Subject to any disclaimer, the term of this patent is extended or adjusted under 35 U.S.C. 154(b) by 0 days. days.

(21) Appl. No.: 14/888,367

(22) PCT Filed: Apr. 30, 2015

(86) PCT No.: PCT/CN2015/077973
§ 371 (c)(1),
(2) Date: Sep. 1, 2016

(87) PCT Pub. No.: WO2016/172923
PCT Pub. Date: Nov. 3, 2016

(65) Prior Publication Data
US 2016/0379072 A1 Dec. 29, 2016

(51) Int. Cl.
*G06K 9/00* (2006.01)
*G06T 7/00* (2017.01)

(52) U.S. Cl.
CPC ..... *G06K 9/00906* (2013.01); *G06K 9/00248* (2013.01); *G06K 9/00255* (2013.01);
(Continued)

(58) Field of Classification Search
CPC .......... G06K 9/00248; G06K 9/00255; G06K 9/00288; G06K 9/00906; G06K 2009/00939; G06T 7/00
See application file for complete search history.

(56) References Cited

U.S. PATENT DOCUMENTS

| | | |
|---|---|---|
| 2014/0023235 A1 | 1/2014 | Cennini et al. |
| 2014/0241588 A1* | 8/2014 | Rocque ..................... G06T 7/20 |
| | | 382/107 |

FOREIGN PATENT DOCUMENTS

| | | |
|---|---|---|
| CN | 101999900 | 4/2011 |
| CN | 102341811 | 2/2012 |

(Continued)

OTHER PUBLICATIONS

Machine Translation of CN 102341811 A, Accessed on Aug. 22, 2017.*

(Continued)

*Primary Examiner* — Edward Park
(74) *Attorney, Agent, or Firm* — Hamre, Schumann, Mueller & Larson, P.C.

(57) ABSTRACT

The application relates to a video detection method, a video detection system, and a computer program product, which can implement liveness detection for a human body. The video detection method comprises: obtaining video data acquired by a video data acquisition device; determining a to-be-detected object based on the video data; obtaining a to-be-detected signal corresponding to the to-be-detected object; and determining whether the to-be-detected signal is a liveness physiological signal, wherein the to-be-detected signal is a frequency domain signal corresponding to the video data of the to-be-detected object.

9 Claims, 6 Drawing Sheets

(52) U.S. Cl.
CPC ............ *G06K 9/00288* (2013.01); *G06T 7/00* (2013.01); *G06K 2009/00939* (2013.01)

(56) References Cited

FOREIGN PATENT DOCUMENTS

| | | | |
|---|---|---|---|
| CN | 102341811 A | * | 2/2012 |
| CN | 104143078 | | 11/2014 |
| WO | 2014184436 | | 11/2014 |

OTHER PUBLICATIONS

First Chinese Office Action, issued in the corresponding Chinese patent application No. 201580000329.0, dated Aug. 29, 2016, 9 pages.
Second Chinese Office Action, issued in the corresponding Chinese patent application No. 201580000329.0, dated Dec. 23, 2016, 11 pages.
International Search Report and Written Opinion issued in the corresponding International application No. PCT/CN2015/077973, dated Jan. 13, 2016, 18 pages.

* cited by examiner

VIDEO DETECTION METHOD, VIDEO DETECTION SYSTEM AND COMPUTER PROGRAM PRODUCT

TECHNICAL FIELD

The present disclosure relates to the field of video detection, and more particularly, to a video detection method, a video detection system, and a computer program product, which can implement liveness detection for a human body.

BACKGROUND

At present, the face recognition systems are more and more applied to scenarios that require an ID authentication in fields like security, finance etc., such as remote bank account opening, access control system, remote transaction operating verification etc. In these application fields with high security level, in addition to ensuring that a face similarity of an authenticatee matches with library data stored in a database, first, it needs that the authenticatee is a legitimate biological living body. That is to say, the face recognition system needs to be able to prevent an attacker from attacking using pictures, 3D face models, or masks and so on.

The method for solving the above problem is usually called liveness detection, which aims to determine whether an obtained physiological feature comes from a living, in-field, real person. Liveness verification schemes acknowledged as mature do not exit among technology products on the market, conventional liveness detection techniques either depend on specific hardware devices (such as infrared camera, depth camera) or can prevent only simple attacks from static pictures.

SUMMARY

In view of the above problem, the present disclosure is proposed. The present disclosure provides a video detection method, a video detection system, and a computer program product, which can perform liveness detection by extracting a physiological signal with regularity from a video image sequence of an authenticatee, and thereby effectively prevent attacks using pictures, 3D face models, or masks and so on.

According to an embodiment of the present disclosure, there is provided a video detection method, comprising: obtaining video data acquired by a video data acquisition device; determining a to-be-detected object based on the video data; obtaining a to-be-detected signal corresponding to the to-be-detected object; and determining whether the to-be-detected signal is a liveness physiological signal, wherein the to-be-detected signal is a frequency domain signal corresponding to the video data of the to-be-detected object.

In addition, in the video detection method according to an embodiment of the present disclosure, wherein determining a to-be-detected object based on the video data comprises: determining, based on the video data, a face image therein as the to-be-detected object, and determining at least one key point in the face image.

In addition, in the video detection method according to an embodiment of the present disclosure, wherein obtaining a to-be-detected signal corresponding to the to-be-detected object comprises: performing Fourier transform on the video data of the to-be-detected object, and extracting a frequency domain signal of the video data in a predetermined frequency range as the to-be-detected signal.

In addition, in the video detection method according to an embodiment of the present disclosure, wherein performing Fourier transform on the video data of the to-be-detected object, and extracting a frequency domain signal of the video data in a predetermined frequency range as the to-be-detected signal comprises: performing Fourier transform on a position sequence of the at least one key point to obtain a first frequency domain signal of the at least one key point, extracting a first component coefficient of the first frequency domain signal in the predetermined frequency range to regard the first component coefficient as a first vector signal; performing Fourier transform on data in a local image region of the at least one key point to obtain a second frequency domain signal of the at least one key point, extracting a second component coefficient of the second frequency domain signal in the predetermined frequency range in time domain, space domain and a predetermined spatial range to regard the second component coefficient as a second vector signal; and combining the first vector signal and the second vector signal to generate a third vector signal as the to-be-detected signal.

In addition, in the video detection method according to an embodiment of the present disclosure, wherein determining whether the to-be-detected signal is a liveness physiological signal comprises: comparing the to-be-detected signal with a predetermined liveness physiological signal to determine whether the to-be-detected signal is a liveness physiological signal.

In addition, in the video detection method according to an embodiment of the present disclosure, wherein the predetermined liveness physiological signal is a physiological signal corresponding to at least one of heartbeat, breathing, and fibrillation of a living body.

In addition, in the video detection method according to an embodiment of the present disclosure, wherein the predetermined frequency range is a range corresponding to frequency of movement of the living body, the predetermined spatial range is a spatial range corresponding to a physiological size of a key point of the living body.

According to another embodiment of the present disclosure, there is provided a video detection system, comprising: a processor; a memory; and computer program instructions stored in the memory and configured to perform the following steps when being executed by the processor: obtaining video data acquired by a video data acquisition device; determining a to-be-detected object based on the video data; obtaining a to-be-detected signal corresponding to the to-be-detected object; and determining whether the to-be-detected signal is a liveness physiological signal, wherein the to-be-detected signal is a frequency domain signal corresponding to the video data of the to-be-detected object.

In addition, in the video detection method according to another embodiment of the present disclosure, wherein performing the step of determining a to-be-detected object based on the video data when the computer program instructions are executed by the processor comprises: determining, based on the video data, a face image therein as the to-be-detected object, and determining at least one key point in the face image.

In addition, in the video detection method according to another embodiment of the present disclosure, wherein performing the step of obtaining a to-be-detected signal corresponding to the to-be-detected object when the computer program instructions are executed by the processor comprises: performing Fourier transform on the video data of the to-be-detected object, and extracting a frequency domain signal of the video data in a predetermined frequency range as the to-be-detected signal.

In addition, in the video detection method according to another embodiment of the present disclosure, wherein performing the step of performing Fourier transform on the video data of the to-be-detected object, and extracting a frequency domain signal of the video data in a predetermined frequency range as the to-be-detected signal when the computer program instructions are executed by the processor comprises: performing Fourier transform on a position sequence of the at least one key point to obtain a first frequency domain signal of the at least one key point, extracting a first component coefficient of the first frequency domain signal in the predetermined frequency range to regard the first component coefficient as a first vector signal; performing Fourier transform on data in a local image region of the at least one key point to obtain a second frequency domain signal of the at least one key point, extracting a second component coefficient of the second frequency domain signal in the predetermined frequency range in time domain, space domain and a predetermined spatial range to regard the second component coefficient as a second vector signal; and combining the first vector signal and the second vector signal to generate a third vector signal as the to-be-detected signal.

In addition, in the video detection method according to another embodiment of the present disclosure, wherein performing the step of determining whether the to-be-detected signal is a liveness physiological signal when the computer program instructions are executed by the processor comprises: comparing the to-be-detected signal with a predetermined liveness physiological signal to determine whether the to-be-detected signal is a liveness physiological signal.

In addition, in the video detection method according to another embodiment of the present disclosure, wherein the predetermined liveness physiological signal is a physiological signal corresponding to at least one of heartbeat, breathing, and fibrillation of a living body.

In addition, in the video detection method according to another embodiment of the present disclosure, wherein the predetermined frequency range is a range corresponding to frequency of movement of the living body, the predetermined spatial range is a spatial range corresponding to a physiological size of a key point of the living body.

According to yet another embodiment of the present disclosure, there is provided a computer program product, comprising a computer-readable medium on which computer program instructions configured to perform the following steps when being executed by a computer are stored: obtaining video data acquired by a video data acquisition device; determining a to-be-detected object based on the video data; obtaining a to-be-detected signal corresponding to the to-be-detected object; and determining whether the to-be-detected signal is a liveness physiological signal, wherein the to-be-detected signal is a frequency domain signal corresponding to the video data of the to-be-detected object.

It is to be understood that both the foregoing general descriptions and the following detailed descriptions are exemplary and intended to provide further explanations of the claimed technique.

BRIEF DESCRIPTION OF THE DRAWINGS

Through the more detailed description of embodiments of the present disclosure with reference to the accompanying drawings, the above and other objectives, features, and advantages of the present disclosure will become more apparent. The drawings are to provide further understanding for the embodiments of the present disclosure and constitute a portion of the specification, and are intended to interpret the present disclosure together with the embodiments rather than to limit the present disclosure. In the drawings, the same reference sign generally refers to the same component or step.

DETAILED DESCRIPTION OF THE EMBODIMENTS

To make the objectives, technical solutions, and advantages of the present disclosure more clear, exemplary embodiments of the present disclosure will be described in detail with reference to the accompanying drawings. Obviously, the described embodiments merely are only part of the embodiments of the present disclosure, rather than all of the embodiments of the present disclosure, it should be understood that the present disclosure is not limited to the exemplary embodiments described herein. All other embodiments obtained by those skilled in the art without paying inventive efforts should all fall into the protection scope of the present disclosure.

Hereinafter, preferred embodiments of the present disclosure will be described in detail with reference to the accompanying drawings.

Figure 1:
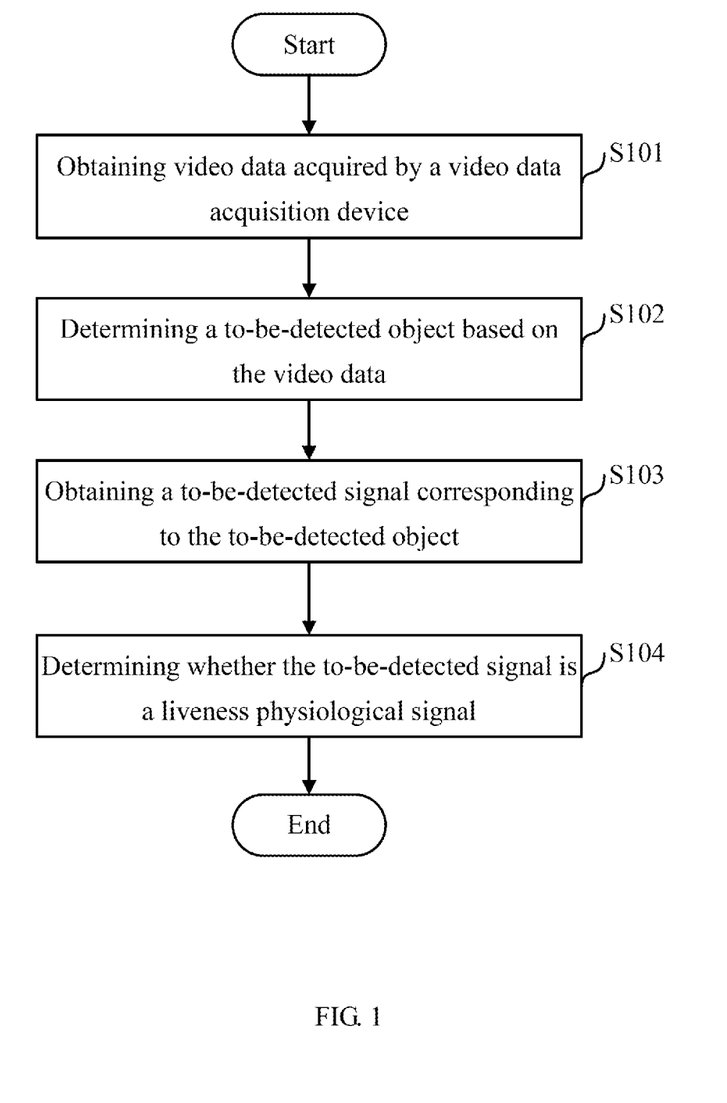
FIG. 1 is a flowchart illustrating the video detection method according to an embodiment of the present disclosure.

FIG. 1 is a flowchart illustrating the video detection method according to an embodiment of the present disclosure. As shown in FIG. 1, the video detection method according to an embodiment of the present disclosure comprises the following steps.

In step S101, obtaining video data acquired by a video data acquisition device. In an embodiment of the present disclosure, the video data acquisition device is a camera (such as RGB camera or depth camera) capable of acquiring video data of a subject. Obtaining video data acquired by a video data acquisition device comprises, but not limited to, after video data is acquired by a video data acquisition device that is configured separately in terms of physical position, video data transmitted from the video data acquisition device is received in a wired or wireless manner. Alternatively, the video data acquisition device may be physically located on the same position or even within the same housing together with other modules or components in the video detection system, the other modules or components in the video detection system receive the video data transmitted by the video data acquisition device via an internal bus.

In an embodiment of the present disclosure, the video data acquired by the video data acquisition device may be a segment of video with a continuous predetermined period (e.g., 3 seconds). A face which serves as the object for video detection needs to clearly appear in the video. Preferably, size of the video image is not less than 64×64 pixels. In the following description, I[t] may be used to represent a face image at a moment t, then I[t][x][y] represents a pixel value whose position is (x, y) at a moment t. Thereafter, the processing proceeds to step S102.

In step S102, determining a to-be-detected object based on the video data. In an embodiment of the present disclosure, it is possible to obtain, in the video data, a position of the face in the video image by using a face detector (such as Adaboost Cascade) that is trained in advance. Further, it is possible to use a trained convolution neural network regression to obtain a position of each key point in a detected face image P={(x[i], y[i])|i=1 . . . p}, where (x[i], y[i]) is the position of the i-th key point. In the following description, with $P_x(i, t)$ and $P_y(i, t)$ are used to represent x and y coordinates of i-th key point of the face at a moment t. In an embodiment of the present disclosure, the key point comprises, but not limited to, nose, eyes, brow, mouth, chin etc. Thereafter, the processing proceeds to step S103.

In step S103, obtaining a to-be-detected signal corresponding to the to-be-detected object. Fourier transform is performed on the video data of the to-be-detected object as obtained step S102, and a frequency domain signal of the video data in a predetermined frequency range is extracted as the to-be-detected signal. And further, Fourier transform is performed on a position sequence of the at least one key point to obtain a first frequency domain signal $P_X$ and $P_Y$ of the at least one key point, a first component coefficient of the first frequency domain signal in the predetermined frequency range is extracted to regard the first component coefficient as a first vector signal; Fourier transform is performed on data in a local image region (i.e., a small image region with the associated key point as a center) of the at least one key point to obtain a second frequency domain signal of the at least one key point, a second component coefficient of the second frequency domain signal in the predetermined frequency range in time domain, space domain and a predetermined spatial range is extracted to regard the second component coefficient as a second vector signal; and the first vector signal and the second vector signal to generate a third vector signal are combined as the to-be-detected signal. Expressions of the first frequency domain signal of the key point, the local image data of the key point, and the second frequency domain signal of the key point are as below:

$$\tilde{P}_X(i, \omega) = \sum_t P_X(i, t)e^{j\omega t}, j = \sqrt{-1}$$

$$\tilde{P}_Y(i, \omega) = \sum_t P_Y(i, t)e^{j\omega t}, j = \sqrt{-1}$$

$$J(i, t, x, y) = I(t, P_X(i, t) + x, P_Y(i, t) + y)$$

$$\tilde{J}(i, \omega_t, \omega_x, \omega_y) = \sum_{t,x,y} J(i, t, x, y)e^{j(\omega_t t + \omega_x x + \omega_y y)}, j = \sqrt{-1}$$

Hereinafter, the processing of obtaining a to-be-detected signal corresponding to the to-be-detected object will be described in further detail with reference to the flowchart. Thereafter, the processing proceeds to step S104.

In step S104, determining whether the to-be-detected signal is a liveness physiological signal. In an embodiment of the present disclosure, the to-be-detected signal obtained in step S103 is sent into an input layer of a trained depth neural network, corresponding signals for respective hidden layers are calculated in sequence, and finally a Boolean value of an output layer is calculated, based on this Boolean value, it is determined whether the to-be-detected signal passes the liveness testing.

The video detection method according to an embodiment of the present disclosure as described above can perform liveness detection by extracting a physiological signal with regularity from a video image sequence of an authenticatee, and thereby effectively prevent attacks using pictures, 3D face models, or masks and so on.

Hereinafter, a video detection system that performs the video detection method will be further described with reference to FIG. 2.

Figure 2:
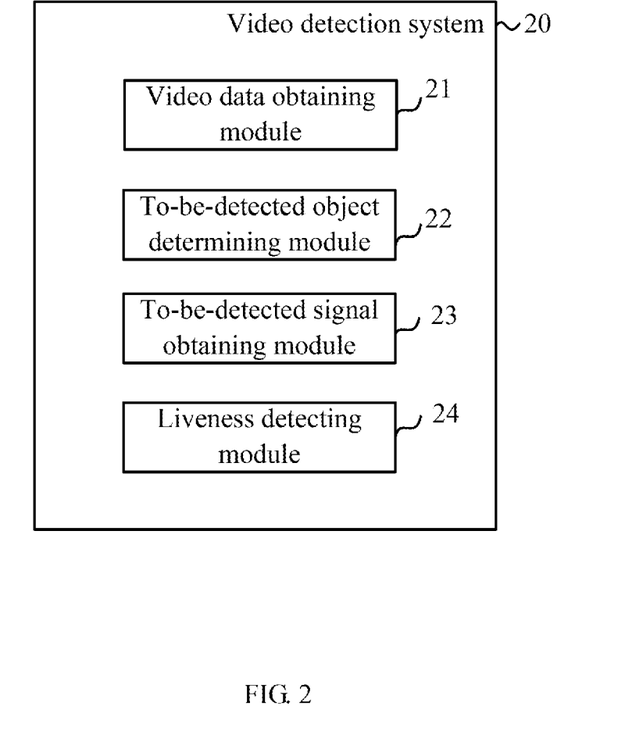
FIG. 2 is a functional block diagram illustrating the video detection system according to embodiment of the present disclosure.

FIG. 2 is a functional block diagram illustrating the video detection system according to embodiment of the present disclosure. As shown in FIG. 2, the video detection system 20 according to an embodiment of the present disclosure comprises a video data obtaining module 21, a to-be-detected object determining module 22, a to-be-detected signal obtaining module 23, and a liveness detecting module 24. The video data obtaining module 21, the to-be-detected object determining module 22, the to-be-detected signal obtaining module 23, and the liveness detecting module 24 may for example be configured with hardware (server, computer, etc.), software, firmware, and any possible combination thereof.

Specifically, the video data obtaining module 21 is configured to obtain video data. In an embodiment of the present disclosure, the video data obtaining module 21 may be a video acquisition device of a RGB camera capable of acquiring video data of a subject. In another embodiment of the present disclosure, the video data obtaining module 21 may comprise a depth camera (depth vidicon) capable of acquiring depth information of a subject. The video data obtaining module 21 may be physically separated from the to-be-detected object determining module 22, the to-be-detected signal obtaining module 23, and the liveness detecting module 24 that are provided subsequently, or may be physically located on the same position or within the same housing together with the to-be-detected object determining module 22, the to-be-detected signal obtaining module 23, and the liveness detecting module 24 that are provided subsequently. In the case where the video data obtaining module 21 is physically separated from the to-be-detected object determining module 22, the to-be-detected signal obtaining module 23, and the liveness detecting module 24 that are provided subsequently, the video data obtaining module 21 further transmits, in a wired or wireless manner, depth video data acquired by the video acquisition device to those modules that are provided subsequently. In the case where the video data obtaining module 21 is physically located on the same position or within the same housing together with the to-be-detected object determining module 22, the to-be-detected signal obtaining module 23, and the liveness detecting module 24 that are provided subsequently, the video data obtaining module 21 further transmits, via an internal bus, depth video data acquired by the video acquisition device to those modules that are provided subsequently. Said video data may be RGB chromatic video data or RGBD video data including depth information. Prior to transmitting the video data in a wired or wireless manner or via a bus, it is possible to encode the video data with a predetermined format and compress it as a video packet, so as to reduce traffic and bandwidth that are required by the transmission.

In addition, as described above, in an embodiment of the present disclosure, the video data acquired by the video data obtaining module 21 may be a segment of video with a continuous predetermined period (e.g., 3 seconds). A face which serves as the object for video detection needs to clearly appear in the video. Preferably, size of the video image is not less than 64×64 pixels. In the following description, I[t] may be used to represent a face image at a moment t, then I[t][x][y] represents a pixel value whose position is (x, y) at a moment t.

The to-be-detected object determining module 22 is configured to determine a to-be-detected object based on the video data acquired by video data obtaining module 21. As described above, the to-be-detected object determining module 22 may obtain, in the video data, a position of the face in video image by using a face detector (such as Adaboost Cascade) that is trained in advance. Further, the to-be-detected object determining module 22 may use a trained convolution neural network regression to obtain a position of each key point in a detected face image P={(x[i], y[i])|i=1 ... p}, where (x[i], y[i]) is the position of the i-th key point. In the following description, with $P_x(i, t)$ and $P_y(i, t)$ are used to represent x and y coordinates of i-th key point of the face at a moment t. The key point determined by the to-be-detected object determining module 22 comprises, but not limited to, nose, eyes, brow, mouth, chin etc.

The to-be-detected signal obtaining module 23 is configured to obtain a to-be-detected signal corresponding to the to-be-detected object determined by the to-be-detected object determining module 22. Specifically, in an embodiment of the present disclosure, the to-be-detected signal obtaining module 23 performs Fourier transform on the video data of the to-be-detected object determined by the to-be-detected object determining module 22, and extracts a frequency domain signal of the video data in a predetermined frequency range as the to-be-detected signal. Next, the processing of extracting the to-be-detected signal will be described in further detail with reference to the flowchart.

The liveness detecting module 24 is configured to determine whether the to-be-detected signal is a liveness physiological signal by performing liveness detection on the to-be-detected signal extracted by the to-be-detected signal obtaining module 23. In an embodiment of the present disclosure, the liveness physiological signal is a physiological signal corresponding to at least one of heartbeat, breathing, and fibrillation of a living body. The liveness physiological signal is a physiological signal that does not exist in pictures, 3D face models, or masks and so on. Next, processing flows of liveness detection on the to-be-detected signal will be further described with reference to the flowchart.

Flows of respective steps of the video detection method according to an embodiment of the present disclosure as executed by respective modules of the video detection system according to an embodiment of the present disclosure will be described in detail below with reference to the accompanying drawings.

Figure 3:
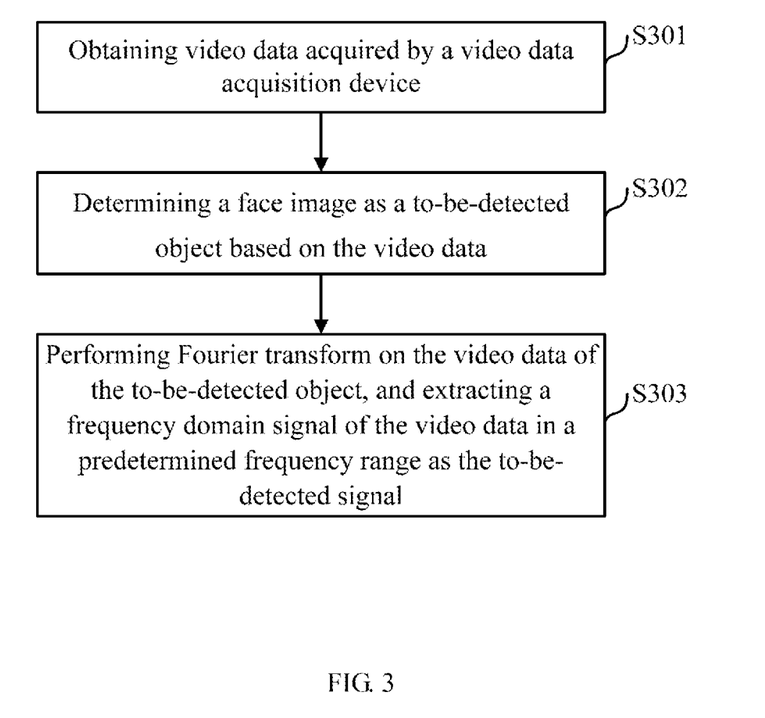
FIG. 3 is a flowchart further illustrating determination of a to-be-detected object in the video detection method according to an embodiment of the present disclosure.

FIG. 3 is a flowchart further illustrating determination of a to-be-detected object in the video detection method according to an embodiment of the present disclosure. As shown in FIG. 3, in the video detection method according to an embodiment of the present disclosure, the flow of determining a to-be-detected object comprises the following steps.

In step S301, obtaining video data acquired by a video data acquisition device. In an embodiment of the present disclosure, the video data acquired by the video data acquisition device may be a segment of video with a continuous predetermined period (e.g., 3 seconds). A face which serves as the object for video detection needs to clearly appear in the video. Preferably, size of the video image is not less than 64×64 pixels. In the following description, I[t] may be used to represent a face image at a moment t, then I[t][x][y] represents a pixel value whose position is (x, y) at a moment t. Thereafter, the processing proceeds to step S302.

In step S302, determining a face image as a to-be-detected object based on the video data. In an embodiment of the present disclosure, it is possible to obtain, in the video data, a position of the face in the video image by using a face detector (such as Adaboost Cascade) that is trained in advance. Further, it is possible to use a trained convolution neural network regression to obtain a position of each key point in a detected face image P={(x[i], y[i])|i=1 ... p}, where (x[i], y[i]) is the position of the i-th key point. Thereafter, the processing proceeds to step S303.

In step S303, performing Fourier transform on the video data of the to-be-detected object, and extracting a frequency domain signal of the video data in a predetermined frequency range as the to-be-detected signal. Next, the processing of obtaining a to-be-detected signal in the video detection method according to an embodiment of the present disclosure will be described in further detail with reference to the flowchart.

Figure 4:
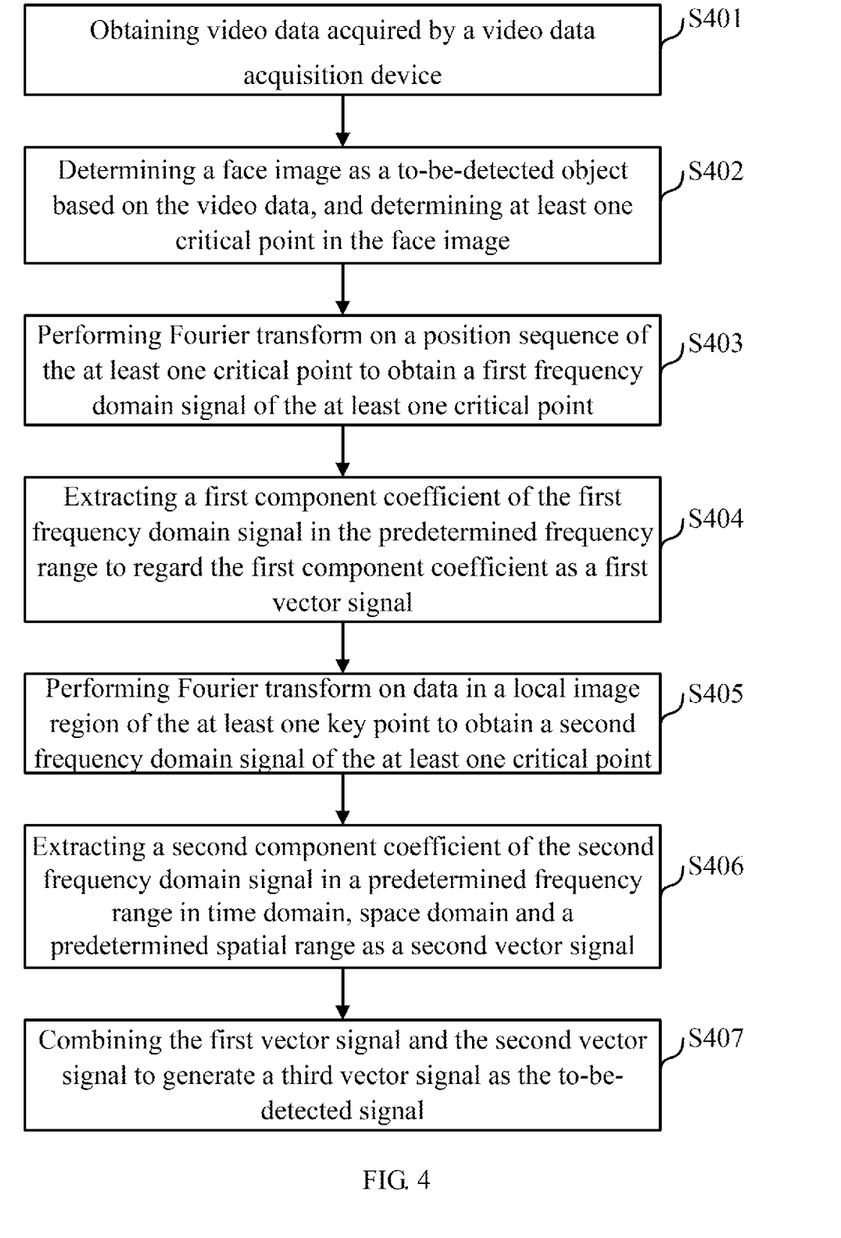
FIG. 4 is a flowchart further illustrating obtainment of a to-be-detected signal in the video detection method according to embodiment of the present disclosure.

FIG. 4 is a flowchart further illustrating obtainment of a to-be-detected signal in the video detection method according to embodiment of the present disclosure. As shown in FIG. 4, in the video detection method according to an embodiment of the present disclosure, the flow of obtaining a to-be-detected signal comprises the following steps.

Steps S401 and S402, which are the same as steps S301 and S302, respectively, repeated descriptions are omitted here.

In step S403, performing Fourier transform on a position sequence of the at least one key point to obtain a first frequency domain signal of the at least one key point. Specifically, for each key point i, performing fast Fourier transform on its spatial coordinates Px[i] and Py[i] to obtain their respective spectrum Px'[i] and Py'[i] as the first frequency-domain signal of the key point. Thereafter, the processing proceeds to step S404.

In step S404, extracting a first component coefficient of the first frequency domain signal in the predetermined frequency range to regard the first component coefficient as a first vector signal. Specifically, as for the spectrum Px'[i] and Py'[i] obtained in step S403, intercepting a coefficient of a component in a predetermined frequency range of 0.25 to 2 Hz. Intercepted coefficients for all the critical points are stitched together to obtain a first vector signal X1. The predetermined frequency range 0.25 to 2 Hz is a frequency corresponding to human spontaneous microitching. Thereafter, the processing proceeds to step S405.

In Step S405, performing Fourier transform on data in a local image region of the at least one key point to obtain a second frequency domain signal of the at least one key point. Thereafter, the processing proceeds to step S406.

In step S406, extracting a second component coefficient of the second frequency domain signal in a predetermined frequency range in time domain, space domain and a predetermined spatial range to regard the second component coefficient as a second vector signal. Specifically, for each key point i, extracting a small local region in the vicinity of this key point in each frame of the video. That is, for the key point $J[i][t][x][y]=I[t][P_x(i,t)+x][P_y(i,t)+y]$ in the video data in predetermined successive frames, each J[i] is regarded as a three-dimensional tensor on which three-dimensional fast Fourier transform is performed, to obtain their respective spectrum J'[i]. Coefficients of components in a predetermined frequency range (0.25 to 2 Hz) and a predetermined spatial range (0.5 cm to 5 cm) for J'[i] are extracted, the predetermined spatial range corresponds to sizes of mouth, nose and other key points. Intercepted coefficients for all the key points are stitched together to obtain a second vector signal X2. Thereafter, the processing proceeds to step S407.

In step S407, combining the first vector signal and the second vector signal to generate a third vector signal as the to-be-detected signal. Specifically, the first vector signal X1 obtained in step S404 and the second vector signal X2 obtained in step S405 are stitched together to generate a third vector signal X3, as the to-be-detected signal. Next, the flow of performing liveness detection by using the to-be-detected signal obtained in step S407 will be further described with reference to FIG. 5.

Figure 5:
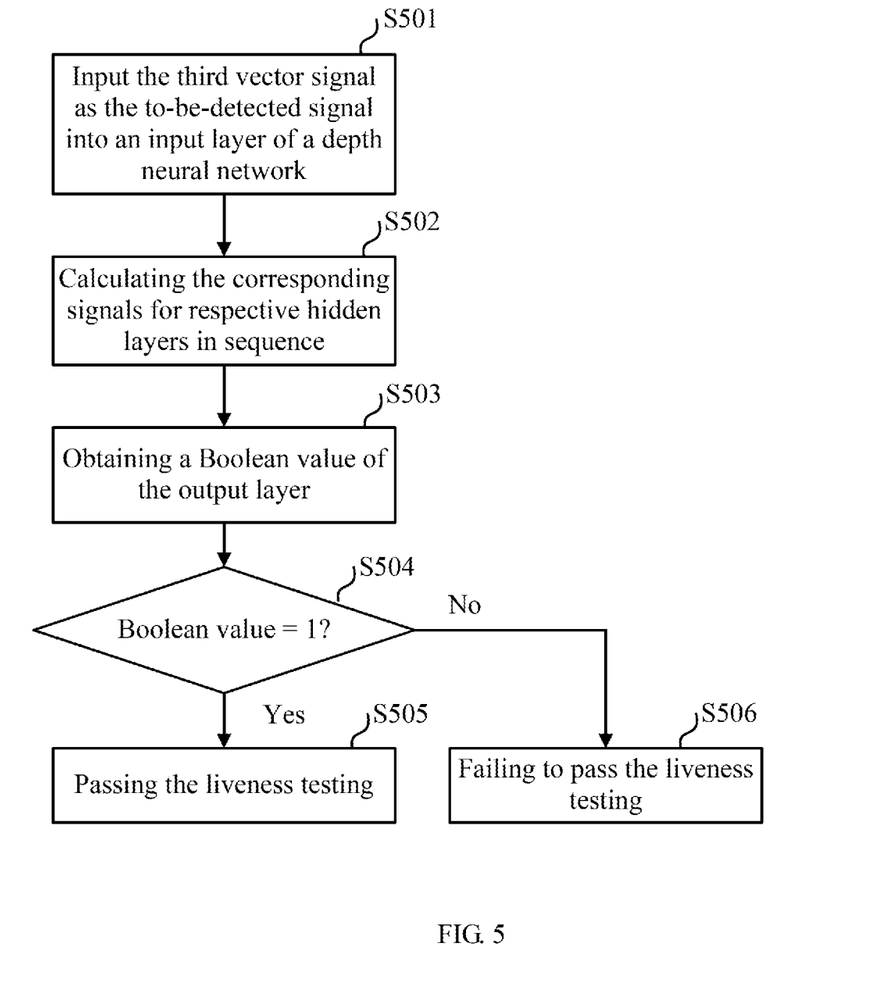
FIG. 5 is a flowchart further illustrating liveness detection on a to-be-detected signal in the video detection method according to embodiment of the present disclosure.

FIG. 5 is a flowchart further illustrating liveness detection on a to-be-detected signal in the video detection method according to embodiment of the present disclosure. As shown in FIG. 5, in the video detection method according to an embodiment of the present disclosure, the flow of performing liveness detection on the to-be-detected signal comprises the following steps.

In step S501, the third vector signal is input, as the to-be-detected signal, into an input layer of a depth neural network. Thereafter, the processing proceeds to step S502.

In step S502, corresponding signals for respective hidden layers are calculated in sequence. Thereafter, the processing proceeds to step S503.

In step S503, a Boolean value of an output layer is calculated. Thereafter, the processing proceeds to step S504.

In step S504, it is determined whether the Boolean value is 1.

If a positive result is obtained in step S504, that is, the Boolean value is 1, then the processing proceeds to step S505, it is determined that the to-be-detected signal passes the liveness testing.

Conversely, if a negative result is obtained in step S506, that is, the Boolean value is not 1, then the processing proceeds to step S506, it is determined that the to-be-detected signal fails to pass the liveness testing.

Figure 6:
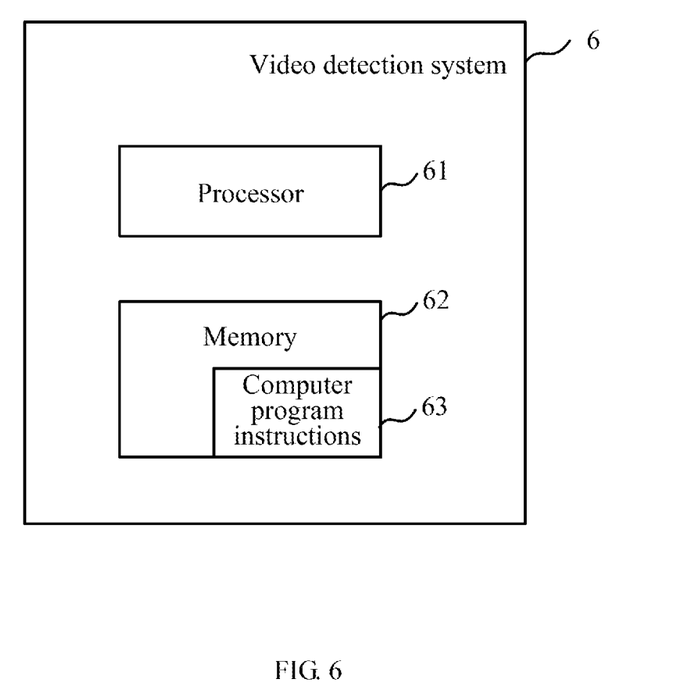
FIG. 6 is a schematic block diagram illustrating the video detection system according to embodiment of the present disclosure.

FIG. 6 is a schematic block diagram illustrating the video detection system according to embodiment of the present disclosure. As shown in FIG. 6, the video detection system 6 according to an embodiment of the present disclosure comprises: a processor 61, a memory 62, and computer program instructions 63 stored in the memory 62.

The computer program instructions 63 can achieve functions of respective functional modules of the video detection system according to an embodiment of the present disclosure and/or execute respective steps of the video detection method according to an embodiment of the present disclosure, when the processor 61 operates.

Specifically, the computer program instructions 63 are configured to perform the following steps when being executed by the processor: obtaining video data acquired by a video data acquisition device; determining a to-be-detected object based on the video data; obtaining a to-be-detected signal corresponding to the to-be-detected object; and determining whether the to-be-detected signal is a liveness physiological signal, wherein the to-be-detected signal is a frequency domain signal corresponding to the video data of the to-be-detected object.

In addition, performing the step of determining a to-be-detected object based on the video data when the computer program instructions 63 are executed by the processor 61 comprises: determining, based on the video data, a face image therein as the to-be-detected object, and determining at least one key point in the face image.

In addition, performing the step of obtaining a to-be-detected signal corresponding to the to-be-detected object when the computer program instructions 63 are executed by the processor 61 comprises: performing Fourier transform on the video data of the to-be-detected object, and extracting a frequency domain signal of the video data in a predetermined frequency range as the to-be-detected signal.

In addition, performing the step of performing Fourier transform on the video data of the to-be-detected object, and extracting a frequency domain signal of the video data in a predetermined frequency range as the to-be-detected signal when the computer program instructions 63 are executed by the processor 61 comprises: performing Fourier transform on a position sequence of the at least one key point to obtain a first frequency domain signal of the at least one key point, extracting a first component coefficient of the first frequency domain signal in the predetermined frequency range to regard the first component coefficient as a first vector signal; performing Fourier transform on data in a local image region of the at least one key point to obtain a second frequency domain signal of the at least one key point, extracting a second component coefficient of the second frequency domain signal in the predetermined frequency range in time domain, space domain and a predetermined space range to regard the second component coefficient as a second vector signal; and combining the first vector signal and the second vector signal to generate a third vector signal as the to-be-detected signal.

Respective modules in the video detection system according to an embodiment of the present disclosure may be implemented by that the processor in the video detection system according to an embodiment of the present disclosure executes the computer program instructions stored in the memory, or may be implemented by that the computer program instructions stored in the computer-readable storage medium of the computer program product according to an embodiment of the present disclosure are executed by a computer.

The computer-readable storage medium may be any combination of one or more computer-readable storage mediums, e.g., a computer-readable storage medium containing computer-readable program codes for randomly generating action instruction sequences, another computer-readable storage medium containing computer-readable program codes for carrying out authentication on face activities.

The computer-readable storage medium may for example comprise a memory card of a smart phone, a storage unit of a tablet computer, a hard disk of a personal computer, a random access memory (RAM), a read only memory (ROM), an erasable programmable read-only memory (EPROM), a portable compact disc read-only memory (CD-ROM), a USB memory, or a combination of any the aforesaid storage mediums.

Exemplary embodiments of the present disclosure as described in detail in the above are merely illustrative, rather than limitative. However, those skilled in the art should understand that, various modifications, combinations or sub-combinations may be made to these embodiments without departing from the principles and spirits of the present disclosure, and such modifications are intended to fall within the scope of the present disclosure.

What is claimed is:

1. A video detection method, comprising:
    obtaining video data acquired by a video data acquisition device;
    determining, based on the video data, a face image therein as a to-be-detected object, and determining at least one key point in the face image;
    obtaining a to-be-detected signal corresponding to the to-be-detected object; and
    determining whether the to-be-detected signal is a liveness physiological signal,
    wherein the to-be-detected signal is a frequency domain signal corresponding to the video data of the to-be-detected object, and
    wherein obtaining the to-be-detected signal corresponding to the to-be-detected object comprises:
        performing Fourier transform on a position sequence of the at least one key point to obtain a first frequency domain signal of the at least one key point, extracting a first component coefficient of the first frequency domain signal in the predetermined frequency range to regard the first component coefficient as a first vector signal;
        performing Fourier transform on data in a local image region of the at least one key point to obtain a second frequency domain signal of the at least one key point, extracting a second component coefficient of the second frequency domain signal in the predetermined frequency range in time domain, space domain and a predetermined spatial range to regard the second component coefficient as a second vector signal; and
        combining the first vector signal and the second vector signal to generate a third vector signal as the to-be-detected signal.

2. The video detection method as claimed in claim 1, wherein determining whether the to-be-detected signal is a liveness physiological signal comprises:
    comparing the to-be-detected signal with a predetermined liveness physiological signal to determine whether the to-be-detected signal is a liveness physiological signal.

3. The video detection method as claimed claim 2, wherein the predetermined liveness physiological signal is a physiological signal corresponding to at least one of heartbeat, breathing, and fibrillation of a living body.

4. The video detection method as claimed in claim 2, wherein the predetermined frequency range is a range corresponding to frequency of movement of the living body, the predetermined spatial range is a spatial range corresponding to a physiological size of a key point of the living body.

5. A video detection system, comprising:
    a processor;
    a memory; and
    computer program instructions stored in the memory and configured to perform the following steps when being executed by the processor:
        obtaining video data acquired by a video data acquisition device;
        determining, based on the video data, a face image therein as a to-be-detected object, and determining at least one key point in the face image;
        obtaining a to-be-detected signal corresponding to the to-be-detected object; and
        determining whether the to-be-detected signal is a liveness physiological signal,
    wherein the to-be-detected signal is a frequency domain signal corresponding to the video data of the to-be-detected object, and
    wherein obtaining the to-be-detected signal corresponding to the to-be-detected object comprises:
        performing Fourier transform on a position sequence of the at least one key point to obtain a first frequency domain signal of the at least one key point, extracting a first component coefficient of the first frequency domain signal in the predetermined frequency range to regard the first component coefficient as a first vector signal;
        performing Fourier transform on data in a local image region of the at least one key point to obtain a second frequency domain signal of the at least one key point, extracting a second component coefficient of the second frequency domain signal in the predetermined frequency range in time domain, space domain and a predetermined spatial range to regard the second component coefficient as a second vector signal; and
        combining the first vector signal and the second vector signal to generate a third vector signal as the to-be-detected signal.

6. The video detection system as claimed in claim 5, wherein performing the step of determining whether the to-be-detected signal is a liveness physiological signal when the computer program instructions are executed by the processor comprises:
    comparing the to-be-detected signal with a predetermined liveness physiological signal to determine whether the to-be-detected signal is a liveness physiological signal.

7. The video detection frequency as claimed claim 6, wherein the predetermined liveness physiological signal is a physiological signal corresponding to at least one of heartbeat, breathing, and fibrillation of a living body.

8. The video detection frequency as claimed in claim 6, wherein the predetermined frequency range is a range corresponding to frequency of movement of the living body, the predetermined spatial range is a spatial range corresponding to a physiological size of a key point of the living body.

9. A computer program product, comprising a non-transitory computer-readable medium on which computer program instructions configured to perform the following steps when being executed by a computer are stored:
    obtaining video data acquired by a video data acquisition device;
    determining, based on the video data, a face image therein as a to-be-detected object, and determining at least one key point in the face image;
    obtaining a to-be-detected signal corresponding to the to-be-detected object; and
    determining whether the to-be-detected signal is a liveness physiological signal,
    wherein the to-be-detected signal is a frequency domain signal corresponding to the video data of the to-be-detected object, and
    wherein obtaining the to-be-detected signal corresponding to the to-be-detected object comprises:
        performing Fourier transform on a position sequence of the at least one key point to obtain a first frequency domain signal of the at least one key point, extracting a first component coefficient of the first frequency domain signal in the predetermined frequency range to regard the first component coefficient as a first vector signal;

performing Fourier transform on data in a local image region of the at least one key point to obtain a second frequency domain signal of the at least one key point, extracting a second component coefficient of the second frequency domain signal in the predetermined frequency range in time domain, space domain and a predetermined spatial range to regard the second component coefficient as a second vector signal; and combining the first vector signal and the second vector signal to generate a third vector signal as the to-be-detected signal.

* * * * *